United States Patent [19]

Gagneux

[11] Patent Number: 5,004,943
[45] Date of Patent: Apr. 2, 1991

[54] BRUSH HOLDER DEVICE FOR AN ELECTRIC MOTOR HAVING A ROTATABLE COMMUTATOR

[75] Inventor: Georges Gagneux, Chatellerault, France

[73] Assignee: Valeo Systemes d'Essuyage, Montigny-le-Bretonneux, France

[21] Appl. No.: 570,612

[22] Filed: Aug. 21, 1990

[30] Foreign Application Priority Data

Sep. 5, 1989 [FR] France ................... 8911585

[51] Int. Cl.⁵ ............... H01R 39/38; H02K 5/14; H02K 15/00
[52] U.S. Cl. ................... 310/239; 310/42; 310/91
[58] Field of Search ................. 310/239, 42, 43, 91, 310/240, 241, 242, 244, 245, 246

[56] References Cited

U.S. PATENT DOCUMENTS

| | | | |
|---|---|---|---|
| 3,267,312 | 8/1966 | Redick et al. | 310/239 |
| 3,624,434 | 10/1971 | Dafler | 310/90 |
| 3,656,018 | 4/1972 | Maher | 310/242 |
| 3,739,205 | 6/1973 | Winkelmann | 310/42 |
| 4,118,647 | 10/1978 | Brenner et al. | 310/239 |
| 4,596,941 | 6/1986 | Kluck | 310/239 |
| 4,866,322 | 9/1989 | Baumeister et al. | 310/239 |

FOREIGN PATENT DOCUMENTS

| | | | |
|---|---|---|---|
| 0017524 | 10/1980 | European Pat. Off. | |
| 0148702 | 7/1985 | European Pat. Off. | 310/239 |
| 0257407 | 3/1988 | European Pat. Off. | |
| 2625628 | 7/1989 | France | 310/242 |
| 0053531 | 4/1977 | Japan | 310/42 |
| 2113924 | 8/1983 | United Kingdom | 310/239 |

*Primary Examiner*—Steven L. Stephan
*Assistant Examiner*—Dennis R. Haszko
*Attorney, Agent, or Firm*—Dennison, Meserole, Pollack & Scheiner

[57] ABSTRACT

A brush holder device for an electric motor includes a support for the brushes, this support having a central passage through which a commutator, fixed to the shaft of the motor can be introduced. Stop means are also provided for holding the brushes in a position in which they are spaced away from this passage.

In accordance with the invention, the stop means include a cover member having a base which is fixed with respect to the support plate and which is extended axially through a frusto conical wall which is adapted to be folded back on itself.

8 Claims, 2 Drawing Sheets

BRUSH HOLDER DEVICE FOR AN ELECTRIC MOTOR HAVING A ROTATABLE COMMUTATOR

FIELD OF THE INVENTION

This invention relates to brush holder devices for electric motors of the kind having a rotatable commutator.

BACKGROUND OF THE INVENTION

The brushes, or carbon brushes, of an electric motor are generally supported by a support plate having a central passage which allows the rotatable commutator, secured on the shaft of the motor, to be introduced into a position in which it lies in line with the brushes. When the motor is assembled, the brushes are guided and resiliently biassed towards the passage formed in the support plate, so that they then engage frictionally against the commutator and thus allow the current to be conveyed from the input terminals to the rotor of the motor via the commutator.

Some known arrangements are so constructed that they have brushes which, when they are not mounted on the motor, are naturally urged towards the central passage of the support under the resilient action of a spring. In addition, it is necessary to assemble this device manually, and this calls for the use of mechanical means such as a screwdriver for example, to push the brushes back in their respective guides in order to enable the commutator to be introduced into the central passage of the support plate. Such arrangements are not well suited for assembly methods using robotic assembly lines.

In addition, it has also been proposed, for example as described in U.S. Pat. No. 4,866,322, to provide such devices with stop means for retaining the brushes in a position spaced away from the central passage of the support plate so as to allow the commutator to be introduced. The brushes are released after the commutator has been fitted in position, so that they can then come into contact with the latter. To this end, a brush is held by means of a resilient lever, which is connected to the brush holder support plate and which has a protuberance which cooperates with a recess formed in the brush, maintaining it in its guide out of the central passage of the support plate. The motor casing accordingly has an appropriate cut-out portion which allows it, during its assembly and after the commutator has been introduced into the passage, to cooperate with the lever with a view to disengaging the protuberance from the recess in the brush and thus releasing the latter.

However, such a device has certain drawbacks. In practice it is desirable to provide a motor casing, a brush carrier support plate and a lever which are specially designed. This increases production costs. In addition, this cooperation of the lever and the motor casing must be arranged so that it will not take place in a faulty manner, particularly as a result of manufacturing tolerances, which can give rise to hindrance in the releasing of the brushes.

The invention aims to provide a solution for this problem.

DISCUSSION OF THE INVENTION

One object of the invention is to provide a brush holder device which is especially well adapted to be assembled in a robotic assembly line, and which allows the brushes to be held out of position while the motor is not assembled, and to be released during assembly, all with high reliability.

Another object of the invention is to propose a brush holder device which ensures good sealing of the motor, in particular with respect to ingress of dust from outside.

The invention further aims to provide a brush holder device which largely consists of standard components.

The brush holder device of the invention is of the type comprising:

a support for the said brushes, having a central passage which allows the said commutator, fixed with respect to the shaft of the motor, to be introduced in line with the brushes, the brushes being resiliently biassed towards the passage, and stop means for holding the said brushes in a position spaced away from the said central passage for the introduction of the commutator into the passage, and for releasing the said brushes after the commutator has been mounted so as to allow them to come into cooperating contact with the said commutator.

In accordance with a principal feature of the invention, the stop means comprise a cover member having a base, adapted to be secured with respect to the said support, and having formed therein an opening which is coaxial with the said central passage, the said base being extended by a generally frusto conical wall, which is adapted to be folded back on itself and which is joined to an annular end face which surrounds the shaft of the motor, the said foldable wall being adapted to hold the said brushes in the said spaced-away position, and to release them after it has been folded back due to the axial displacement of the said annular end face which is brought about by the introduction of the commutator into the passage.

Preferably, the cover member includes a terminal collar portion, which is joined to the annular end face and which is frusto conical in shape, extending from the said annular end face towards the base of the cover member, so that the free end of the said collar portion surrounds the shaft of the motor, and is in contact therewith so as to ensure sealing.

The foldable wall is most preferably made thinner in the vicinity of that one of its ends which is joined to the base of the cover member.

In a modification, the said foldable wall is joined to the annular end face through a neck or chimney portion of generally cylindrical shape, the said foldable wall then being made thinner in the vicinity of that one of its ends which is joined with the said neck portion.

In one embodiment, the base of the cover member includes a side wall which is cylindrical and which is provided with resilient securing tongues for securing it on the said support.

In accordance with a preferred feature of the invention, the cover member also has a plurality of radial stiffening ribs, which are joined to the side wall as well as to an end wall extending at right angles to the said side wall, and with the opening in the base of the cover member being formed in this end wall.

Further advantages and features of the invention will appear more clearly from a study of the detailed description which follows, which is given by way of example only and with reference to the accompanying drawings.

DESCRIPTION OF PREFERRED EMBODIMENTS OF THE INVENTION

Figure 1:
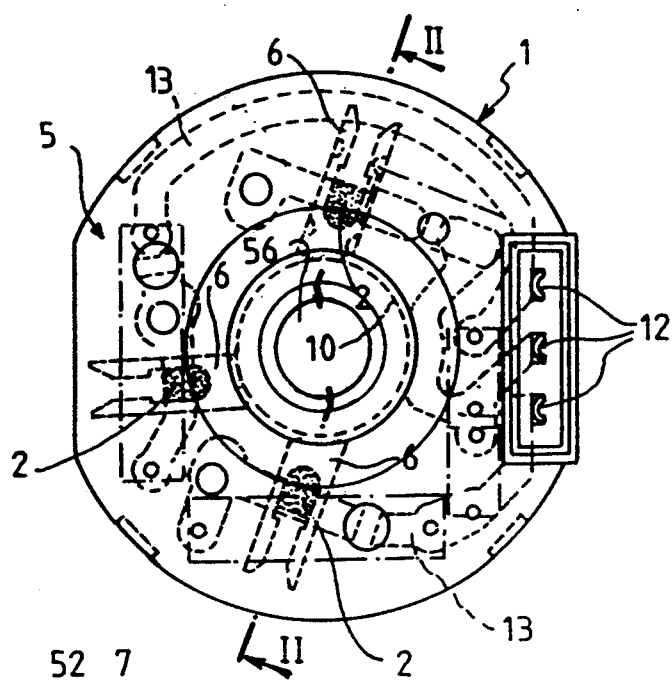
FIG. 1 is a partial front view of a brush holder device in accordance with the invention.

One element of the brush holder device consists of a support plate 1 shown in FIG. 1, which in this example serves to support three brushes 2. The support plate 1 has a central passage 10 which allows the rotatable commutator, not shown in this Figure, of the motor to be introduced in line with the brushes 2.

The brushes 2 are resiliently biassed towards the passage 10 by means of springs, which are not shown in this Figure in the interests of simplification. In this connection it is possible to use helical springs, such as those which are shown diagrammatically in FIG. 2; or indeed, fingers may be provided, extending through the plane of the support plate 1 so as to urge the brushes towards the passage 10, these fingers being fixed with respect to a lever which is mounted below the support plate 1 and which is resiliently biassed.

The brushes 2 are arranged within a substantially radial guide 6, which affords correct guidance of the brushes as they are resiliently biassed towards the passage 10. A printed circuit, including conductors 13, is also provided on the support plate 1 so as to connect the three brushes 2 to the three respective electrical supply terminals 12. The device further includes a cover member 5, which is secured on the periphery of the support plate 1 and which is shown diagrammatically in FIG. 2.

Figure 2:
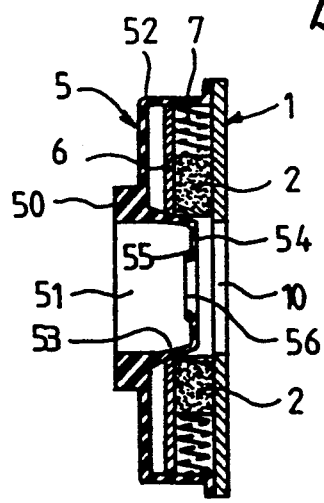
FIG. 2 is a diagrammatic cross section, taken on the line II—II in FIG. 1, of a brush holder device in accordance with the invention.

The cover member 5 includes a side wall 52, generally cylindrical in shape and adapted to be fixed, with respect to the support plate 1, by fastening means which are not shown in FIG. 2 but which consist, for example, of adhesive means or screw means. An annular end wall 50 is joined at right angles to the side wall 52; and an opening 51, coaxial with the central passage 10 of the support plate 1, is formed in the annular end wall 50. The end wall 50 is itself extended axially in a wall 53, which is generally frusto conical and which extends in alignment with at least the brushes 2. In the region in which it joins the end wall 50 of the cover member, the wall 50 is of reduced thickness compared with the latter. The end wall 50 is made of a thermoplastic polyester elastomer, which gives it properties of deformability. The use of such a material, combined with the local thinning of the frusto conical wall 53, enables the latter, as will be seen later on in this description, to be folded axially back on itself without giving rise to any deformation of other parts of the cover member.

The foldable portion 53 terminates in an annular end face 54, which is formed with a hole 56, which is coaxial with the opening 51 in the base of the cover member and arranged to surround the rotating shaft of the motor. From this annular end face 54 there depends a terminal collar portion 55, which extends from the face 54 towards the end wall 50 of the cover member, so that the free end of the collar portion 55 is able to surround the rotating shaft of the motor and to be in contact with it, thus serving a sealing function, in particular against the ingress of dust from outside.

As can be seen from FIG. 2, part of the frusto conical wall 53 of the cover member lies in contact with the brushes 2, and holds the latter in a position spaced away from the central passage 10, so as to allow the eventual introduction of the rotating commutator of the motor into the passage 10.

Figure 3:
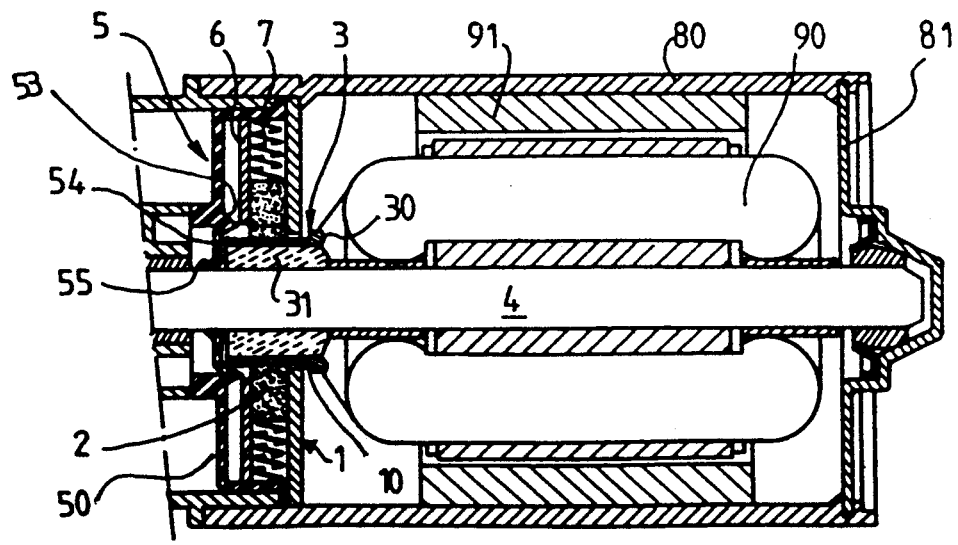
FIG. 3 is a diagrammatic longitudinal cross sectional view of a motor which is equipped with the brush holder device seen in FIG. 2.

FIG. 3 shows more diagrammatically the arrangement of the brush holder device of FIG. 2 during assembly of the motor. In the usual way, the motor includes a casing 80 which is provided with a rear end plate 81 that supports one end of the rotating motor shaft 4. The current is carried from the brushes 2, to the induction windings 90 associated with ferrite cores 91, through a commutator 3 which is secured on the motor shaft 4 and which includes an electrical contact 30 disposed on the outer periphery of an insulating ring 31.

During introduction of the motor shaft 4, in which the commutator 3 is conveyed into the central passage 10 of the device, the motor shaft 4 penetrates into the hole 56 in the face 54, with the terminal collar portion 55 surrounding the motor shaft and in contact with it, until the commutator 3 comes into abutment against the annular end face 54. On continued movement in the direction of introduction of the motor shaft 4, the annular end face 54 undergoes an axial displacement, which causes the frusto conical portion 53 to be folded back, thus releasing the brushes 2. The latter, under the action of the spring 7, then come into frictional engagement against the conductor 30 of the commutator 3. The local thinning of the frusto conical wall 53 in particular enables the initial shape of the annular end face 54 and of the frusto conical collar portion 55 to be preserved, which in turn enables proper sealing to be ensured around the shaft 4.

Figure 5:
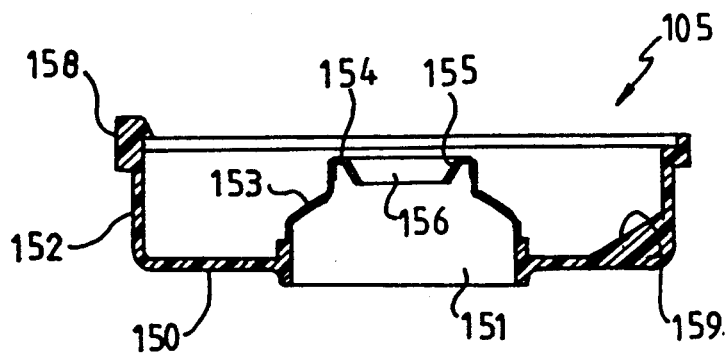
FIG. 5 is a cross sectional view taken on the line V—V in FIG. 4.
Figure 4:
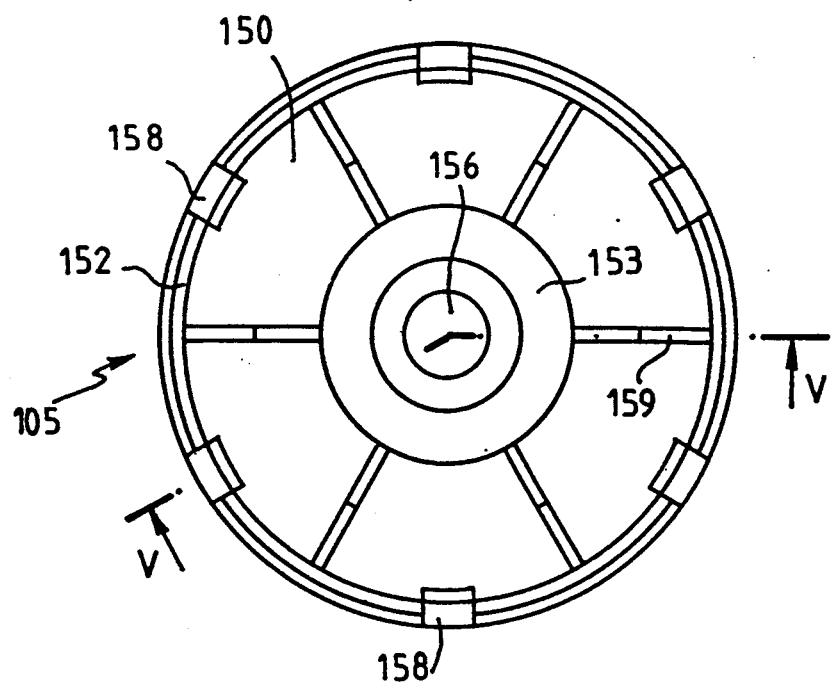
FIG. 4 is a front view of one particular embodiment of a cover member for a device in accordance with the invention.
Figure 6:
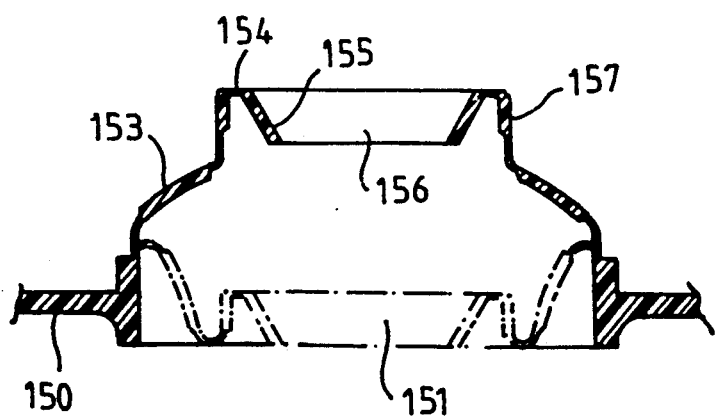
FIG. 6 shows in greater detail part of the cover member seen in FIG. 5.

FIGS. 4 to 6 show another embodiment of the cover member. In these Figures, the elements which are analagous, or which have analagous functions, to those shown in FIG. 2 have been given reference numerals in which 100 is added to the corresponding reference numerals of FIG. 2. Only those features which are different as between FIGS. 5 to 6 and FIG. 2 will be described below.

In this embodiment, the folding wall 153 is joined to the annular end face 154 through a neck or chimney portion 157, which is generally cylindrical in shape and which is shown in greater detail in FIG. 6. The foldable wall 153 is thus not only made thinner in the vicinity of that one of its ends which is joined to the terminal wall 150 at the base of the cover member 105, but is also made thinner in the vicinity of its other end which is joined with the neck portion 157. These two thin portions thus allow the axial displacement of the cylindrical neck portion 157, and also of the end face 154 and the frusto conical collar portion 155, to take place virtually without any deformation. This folded-back position is shown in phantom lines in FIG. 6.

In order to ensure a still better rigidity in the base of the cover member, stiffening ribs 153, which may for example be six in number, are provided. These ribs 153 extend radially on the end wall 150 of the cover member, and are also joined to the side wall 152.

In order to facilitate the fitting of the cover member on to the brush holder support plate 1, the side wall 152 is provided, in the vicinity of its free end, with a plurality, for example six, of securing tongues 158, which are such as to engage resiliently in correspondingly shaped recesses formed in the support plate 1.

The invention is not limited to the embodiments described above, but embraces all variations within the scope of the invention as defined by the claims which follow.

What is claimed is:

1. For an electric motor having a shaft and a commutator fixed on said shaft, a brush holder device comprising:
   a support for brushes, having a central passage whereby to allow the said commutator to be introduced in line with the brushes,
   resilient biassing means carried by the said brush support for biassing the brushes towards the passage, and
   stop means carried by the said brush support for holding the said brushes in a position spaced away from the said central passage for the introduction of the commutator into the passage, and for releasing the said brushes after the commutator has been mounted in position so as to allow them to come into cooperating contact with the said commutator, wherein the stop means comprise a cover member having a base, adapted to be secured with respect to the said brush support, and defining therein an opening which is coaxial with the said central passage, a generally frusto conical foldable wall extending the said base and adapted to be folded back on itself, and an annular end face, for surrounding the motor shaft and being joined to the said foldable wall, with the said foldable wall being adapted to hold the said brushes in the said spaced-away position, and to release them after it has been folded back due to the axial displacement of the said annular end face which is brought about by the introduction of the commutator into the said passage.

2. A device according to claim 1, wherein the cover member further includes a terminal collar portion, which is joined to the annular end face and which is frusto conical in shape, extending from the said annular end face towards the base of the cover member, so that the free end of the said collar portion can surround the shaft of the motor and be in contact therewith.

3. A device according to claim 1, wherein the said foldable wall is made thinner in the vicinity of that one of its ends which is joined to the base of the cover member.

4. A device according to claim 1, wherein the cover member further comprises a neck portion of generally cylindrical shape, joining the said foldable wall to the said annular end face, the said foldable wall being made thinner in the vicinity of that one of its ends which is joined with the said neck portion.

5. A device according to claim 1, wherein the base of the cover member further includes a side wall which is cylindrical, and resilient securing tongues on the said side wall for securing it on the said brush support.

6. A device according to claim 5, wherein the cover member further includes an end wall, which extends at right angles with respect to the said side wall and which defines the said opening therein, and has a plurality of radial stiffening ribs on the base of the cover member, the said ribs being joined to the side wall and the end wall.

7. A device according to claim 1, wherein the cover member is of a thermoplastic polyester elastomer material.

8. An electric motor having a rotatable commutator and further comprising a brush holder device according to claim 1.

* * * * *